(12) United States Patent
Balakrishnan et al.

(10) Patent No.: US 8,086,437 B2
(45) Date of Patent: Dec. 27, 2011

(54) MODELING AND SIMULATING SOFTWARE CONTENTION

(75) Inventors: Ganesh C. Balakrishnan, Redmond, WA (US); Pavel A. Dournov, Redmond, WA (US); John M. Oslake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 12/061,638

(22) Filed: Apr. 2, 2008

(65) Prior Publication Data

US 2009/0254555 A1     Oct. 8, 2009

(51) Int. Cl.
G06F 9/45      (2006.01)
G06F 17/50     (2006.01)

(52) U.S. Cl. .......................... 703/22; 703/13
(58) Field of Classification Search ............ 703/13, 703/22; 717/131–133
See application file for complete search history.

(56) References Cited

U.S. PATENT DOCUMENTS

| | | | |
|---|---|---|---|
| 5,881,268 A | 3/1999 | McDonald et al. | |
| 7,065,763 B1 | 6/2006 | Martin et al. | |
| 7,213,093 B2 | 5/2007 | Hammarlund et al. | |
| 2004/0024797 A1 | 2/2004 | Berry et al. | |
| 2006/0101081 A1* | 5/2006 | Lin et al. | 707/200 |
| 2007/0011302 A1* | 1/2007 | Groner et al. | 709/224 |
| 2007/0157200 A1 | 7/2007 | Hopkins | |
| 2007/0203910 A1 | 8/2007 | Ferguson et al. | |
| 2007/0233450 A1 | 10/2007 | Papaefstathiou et al. | |
| 2007/0239766 A1* | 10/2007 | Papaefstathiou et al. | 707/102 |
| 2008/0133212 A1* | 6/2008 | Krishnamurthy et al. | 703/22 |

OTHER PUBLICATIONS

Friedrich et al., "Performance Evaluation of a Distributed Application Performance Monitor", Dec. 28, 1995, Hewlett Packard Company, 1995, pp. 8.
Kounev et al., "Performance Modelling of Distributed E-Business Applications using Queueing Petri Nets", in Proceedings of the 2003 IEEE International Symposium on Performance Analysis of Systems and Software—ISPASS2003, 2003, pp. 13.
Gijsen et al., "An Integrated Performance Modeling Approach for Distributed Applications and ICT Systems", 2002, pp. 1-12.
Menasce, "Two-Level Iterative Queuing Modeling of Software Contention", Proceedings of the 10th IEEE International Symposium on Modeling, Analysis, & Simulation of Computer & Telecommunications Systems (Mascots•02), IEEE Computer Society, IEEE, 2002, pp. 10.
Yu et al., "Performance Analysis of Concurrency Control Using Locking with Deferred Blocking", IEEE Transactions on Software Engineering, vol. 19, No. 10, Oct. 1993, IEEE, pp. 982-996.

\* cited by examiner

*Primary Examiner* — Dwin M Craig
*Assistant Examiner* — Aniss Chad (57) ABSTRACT

Aspects of the subject matter described herein relate to modeling and simulating software contention. In aspects, a model declares properties of a scarce software object and models software components that need the scarce software object to execute. A simulator uses the model to set up data structures that track locking activity related to the software object. The simulator simulates the interaction between software components and hardware including seizing and releasing locks on the software object. The simulator may use a function or other similar mechanism to distribute seize and release operations with respect to a lock across multiple instances of the software object. The simulator may use data generated by a simulation to provide an indication of lock objects and hardware utilization, transaction latencies, and other statistics.

18 Claims, 7 Drawing Sheets

MODELING AND SIMULATING SOFTWARE CONTENTION

BACKGROUND

Information technology personnel, business planners, and procurement personnel are interested in knowing the hardware and software architecture needed to adequately run software needed by their organizations. Ideally, such people would like to know the hardware needed before they actually purchase the hardware.

In response, software vendors and others have attempted to create software that attempts to determine if selected hardware is suitable to provide responses in a timely manner when selected software is executed on the hardware. Creating an accurate model that takes into account the appropriate interactions, however, is challenging.

SUMMARY

Briefly, aspects of the subject matter described herein relate to modeling and simulating software contention. In aspects, a model declares properties of a scarce software object and models software components that need the scarce software object to execute. A simulator uses the model to set up data structures that track locking activity related to the software object. The simulator simulates the interaction between software components and hardware including seizing and releasing locks on the software object. The simulator may use a function or other similar mechanism to distribute seize and release operations with respect to a lock across multiple instances of the software object. The simulator may use data generated by a simulation to provide an indication of lock and hardware utilization, transaction latencies, and other statistics.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
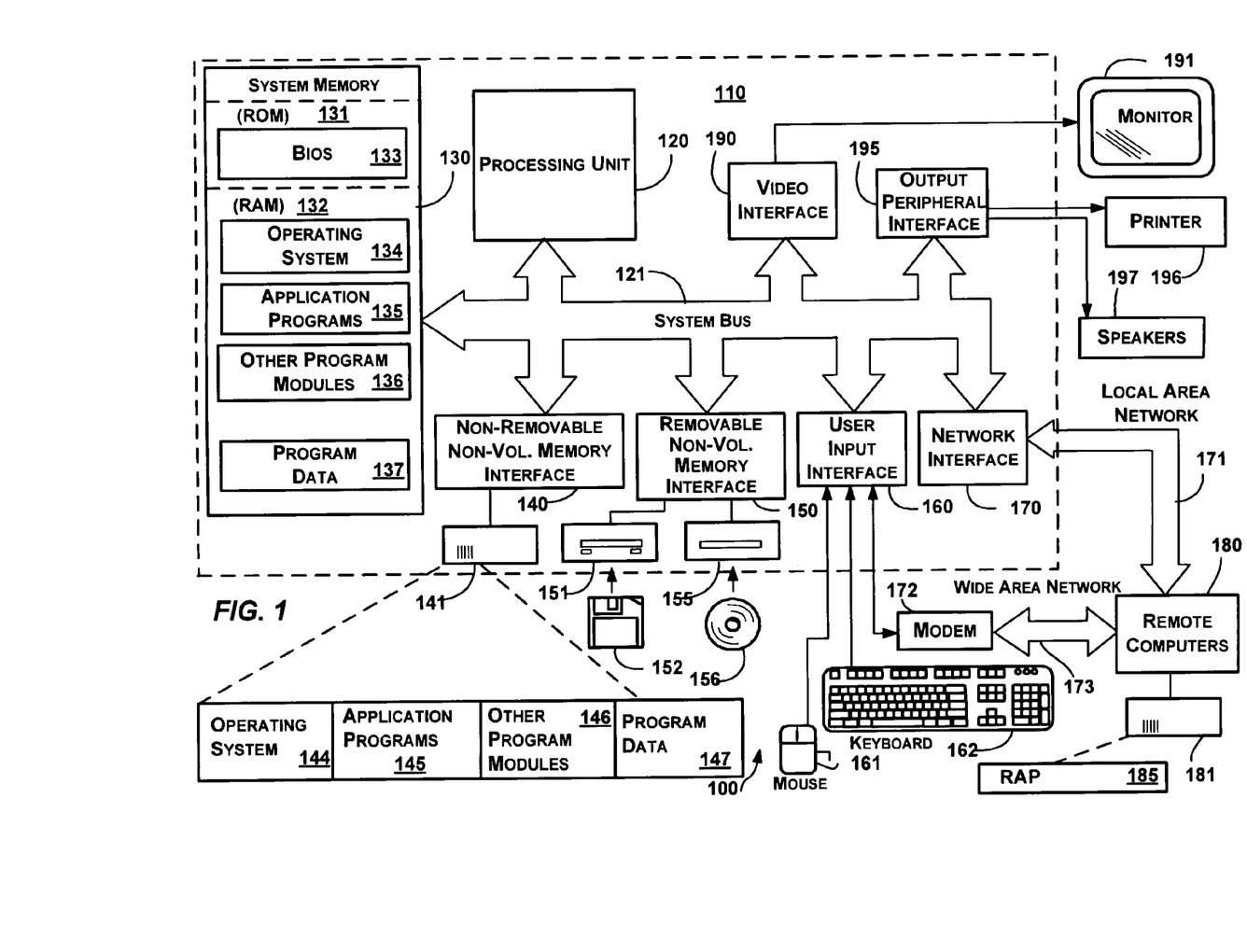
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Modeling and Simulating

As mentioned previously, determining the hardware needs for software is challenging. Software may be constrained by more than just the hardware upon which it runs. The inventors of the current application noticed a phenomenon in which performance of software, particularly distributed software, was constrained in some cases more by the interactions between components of the software than by the interaction of the software with the hardware.

In particular, a first software component may utilize a scarce software object. Depending on the type of utilization (e.g., a write lock), this lock may prevent another software component from utilizing the object until the number of components using the object is less than a maximum number of locks of the type allowed on the object. As a result, the hardware upon which the software executes may not be fully utilized.

Furthermore, if a system does contain software bottlenecks, this may be considered a problem since the capacity and responsiveness of the system cannot necessarily be improved by increasing the performance specification of the hardware. For example, if the number of threads that service a software object is 1, then a multi-processor machine may not provide any performance advantages over a single processor machine since the single thread cannot run on more than one processor at the same time.

Some exemplary software objects that when utilized by one or more software components may halt the progress of other software components that need these objects include thread pools with a limited number of threads, table locks in a database, TCP connections, software queues, critical sections, mutexes, semaphores, and the like. The above list of software objects is not intended to be exhaustive or all-inclusive. Indeed, based on the teachings contained herein, those skilled in the art may recognize other software objects that when utilized by one or more software components may halt the progress of other software components. Such other software objects are also to be included in the spirit and scope of aspects of the subject matter described herein.

These types of software objects are sometimes referred to herein as scarce. The meaning of scarce in this context is a software object that is available only in a finite number. The finite number may be defined via a declaration in modeling data and may be independent of hardware resources. For example, a program may include a predefined number of threads to service requests, even though hardware upon which the program executes may be able to simultaneously execute more than the predefined number of threads.

Figure 2:
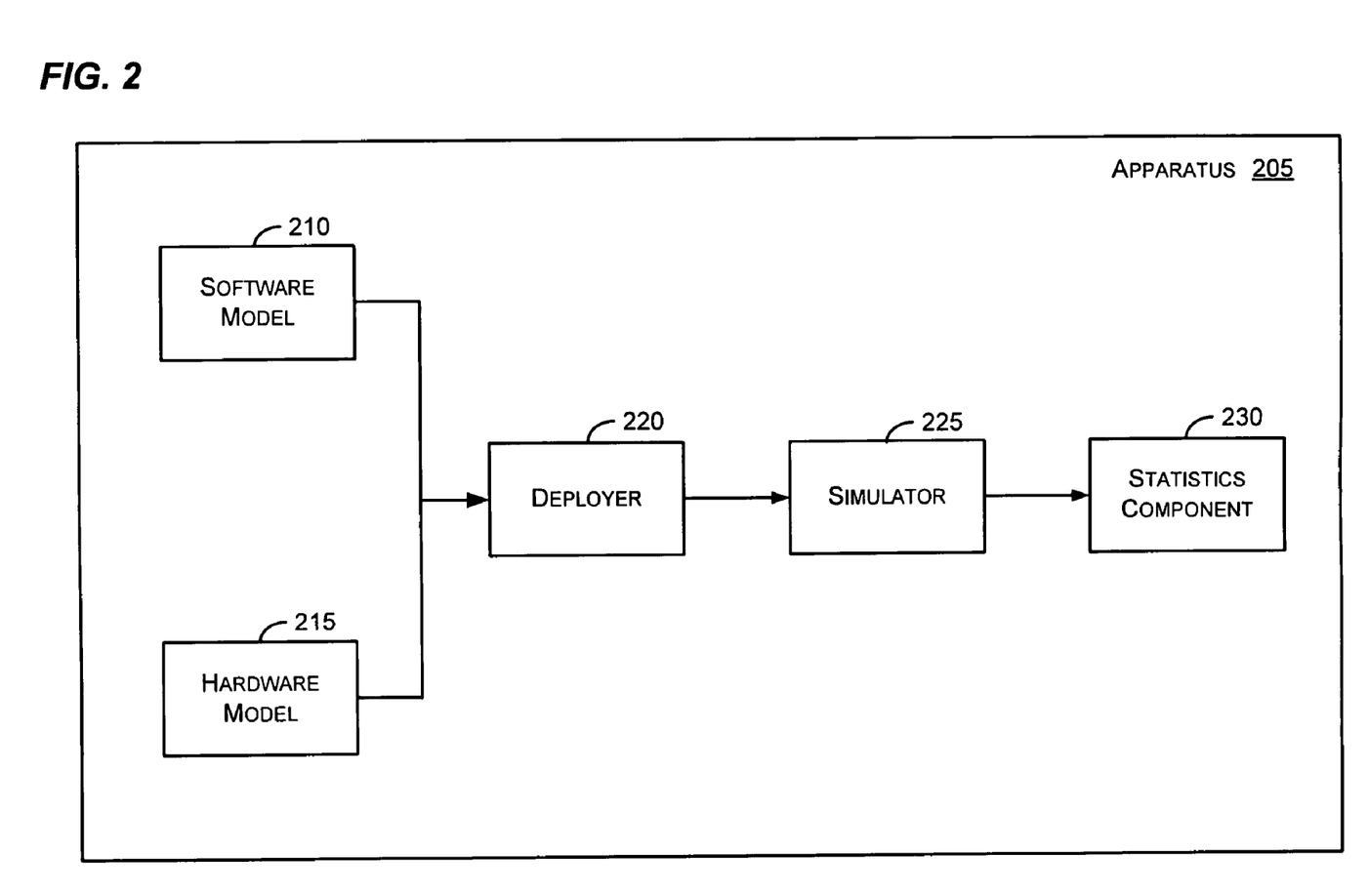
FIG. 2 is a block diagram illustrating various components that may be included in an apparatus arranged in accordance with aspects of the subject matter described herein.

FIG. 2 is a block diagram illustrating various components that may be included in an apparatus arranged in accordance with aspects of the subject matter described herein. The components illustrated in FIG. 2 are exemplary and are not meant to be all-inclusive of components that may be needed or included. In other embodiments, the components or functions described in conjunction with FIG. 2 may be included in other components, placed in subcomponents, or distributed on other devices without departing from the spirit or scope of aspects of the subject matter described herein.

Turning to FIG. 2, the apparatus 205 may include a software model 210, a hardware model 215, a deployer 220, a simulator 225, and a statistics component 230. The software model 210 may include information that defines simulation characteristics of one or more components of software. The information may define actions to take to simulate the software. The information may also indicate a type and number of resources needed to perform each action. The information may also depend on properties of the deployment. For example, the number of resources allocated to perform an action may depend on the number of processors in the computer.

The software model 210 and the hardware model 215 may be stored on a modeling store (e.g., a hard disk or other computer storage medium). Below, examples will be mentioned of what may be included in the software model 210 and what may be included in the hardware model 215. However, in other embodiments, data that is mentioned below as being included in the software model 210 may instead be included in the hardware model 215 and vice versa. Furthermore, some data that is mentioned as being included in the software model 210 or the hardware model 215 may instead be distributed across the software model 210 and the hardware model 215.

The software model 210 may be subdivided into parts that describe components of the software. A component of the software is a portion that can be placed in different places in a simulated system. For example, in an e-mail system, there may be a server component that hosts an e-mail server and multiple client components that host e-mail clients that interact with the e-mail server. In simulation, a component may interact with one or more other components.

Each component definition included in the software model 210 may include methods that indicate actions to take to simulate various features of the component. In one sense, a method may be considered an interface to the component (e.g., something that can be called by other components). The method may call other methods on the same or other components. A method may specify the number and type of a hardware resource needed to complete each action. In addition, a method may specify that a software object is needed to perform one or more actions.

The hardware model 215 may include information that defines simulation characteristics for one or more pieces of hardware. For example, the hardware model 215 may include information that defines capabilities of simulated CPUs, storage, networking, other hardware components, and the like. In addition, the hardware model 215 may also include information that defines characteristics of scarce software objects.

In particular, with reference to the scarce software objects, the hardware model 215 may include one or more lock configuration descriptions. A lock configuration may include a lock configuration identifier, a reference to a lock simulation model, a maximum number of concurrent locks of each type, other related information specific to the lock simulation model, and the like. There may be various lock types declared that reference lock configurations. A lock type declaration corresponds to a scarce software object contained in the component in which the lock type is described. Based on the teachings herein, those skilled in the art may recognize other lock types that would be suitable for placing in a lock declaration without departing from the spirit or scope of aspects of the subject matter described herein.

A portion of an exemplary data structure that may be used to specify information in the software model 215 is as follows:

```
<Component Id="BusinessLogicWebService"
Name="BusinessLogicWebService">
    <ReferenceConfigurations>
        <ReferenceConfiguration
            Id="Lock1"
            Name="Lock configuration"
            Type="SoftwareResourceSimulationModel">
            <Property Name="MaxQueueLength" Value="10000" />
            <Property Name="MaxReadRequestsPerLock"
            Value="10000"/>
            <Property Name="MaxWriteRequestsPerLock" Value="1"/>
        </ReferenceConfiguration>
    </ReferenceConfigurations>
<LockTypes>
    <LockType
        Id="ThreadPoolLock"
        Name="Thread pool lock"
        Configuration="Lock1"
        NumberOfInstancesExpression=
        "@Component.NumberOfLocks"/>
    <LockType
        Id="DatabaseConnectionLock"
        Name="Database connection lock"
        Configuration="Lock1"
        NumberOfInstancesExpression="1"/>
</LockTypes>
...
</Component>
```

Although the above data structure is represented in XML, the information contained therein may also be represented in various other formats without departing from the spirit or scope of aspects of the subject matter described herein.

The above data structure defines two lock types: a thread pool lock and a database connection lock. Each lock has a maximum read requests per lock of 10,000 and a maximum write requests per lock of 1 (which indicates that the write lock is exclusive). The thread pool lock has an identifier of "ThreadPoolLock," while the database connection lock has an identifier of "DatabaseConnectionLock."

A lock property that has not been explained yet is the NumberOfInstancesExpression property. To model some software, it may be useful to have more than one instance of a lock of a particular type. Having multiple instances allows simulation of arbitrary locking patterns as described in more detail below.

For example, a server may host multiple Web services with each Web service having a number of lockable software objects (e.g., connection requests). As yet another example, some tables in a database may get locked far more often than other tables in a database. For example, ninety percent of the transactions associated with one table may be read transactions while ten percent of the transactions associated with the table may be write transactions. In another table, seventy percent of the transactions may be read transactions while thirty percent of the transactions may be write transactions. Requests to lock an object may be directed to a particular instance of the object as will be described below in more detail.

The NumberOfInstancesExpression property is an expression. In a simple case, the expression may equal a constant. In other cases, the expression may equal a variable or may include operators, variables, and/or values to evaluate to obtain the number of instances. An expression may refer to a model parameter which makes the model configurable by the user. For example, the number of available database connections may vary from one deployment to another and making this a parameter to the model allows for executing modeling scenarios where the user is able to evaluate the performance effects of different numbers of database connections and select the optimal number of connections for the particular application deployment.

A method included in the software model 210 may indicate an action associated with a lock. This may be indicated by specifying a lock identifier, a type of operation (e.g., seize or release the lock), a lock operation type (e.g., read, write, etc.), and a lock instance identifier.

In one embodiment, there are two types of actions that may be taken with respect to a lock, namely, a seize action and a release action. A seize action is a request to hold a lock on behalf of a transaction. If the lock cannot be seized by the transaction due to exceeding the maximum count of locks for the lock, the transaction is placed in a queue for the lock. For example, if there are currently ten concurrent read locks, a lock specifies that there can be at most ten concurrent read locks, and a new read lock is requested, the new read lock request is placed in a queue to the lock.

In some embodiments, a transaction may seize multiple locks for a lock in one operation. In such embodiments, such a transaction may not seize the locks until the number of locks available for the lock is greater than or equal to the number of locks the transaction seeks to seize.

A release action is a request to release a lock held by a transaction. When a release action is processed for a lock, this may allow a queued seize lock request to obtain the lock that was released, provided the release and seize locks are of the same type. In one embodiment, queued seize lock requests associated with a particular lock are retrieved from the queue in a first in first out (FIFO) manner. In other embodiments, however, queued seize lock requests may be retrieved in some other order that varies from FIFO. This may be achieved by referencing a different implementation of the lock simulation model from the lock configuration.

Setting a value of 1 as a maximum for a lock may indicate that the lock is exclusive. In other words, the lock may be used by only one transaction at a time and must be released before another transaction may use the lock.

A data structure, rules, or some other mechanism may be used to determine the interaction (e.g., effects), if any, between lock types. For example, if a write lock has been seized and a component desires to seize a read lock, a data structure may indicate that this is or is not allowed. Below is an exemplary table that may be associated with a lock:

| Sample Lock Type | W | R |
| --- | --- | --- |
| W | True (if W locks an object, another W cannot execute if res count is 0) | True (if W locks an object, an R cannot execute if res count is 0) |
| R | False (if R locks an object, a W can execute) | False (if R locks an object, another R can execute) |

The above table indicates that if a write lock has been seized and the maximum number of write locks is one that neither another write lock nor another read lock may be seized on the lock. The table also indicates that if a read lock has been seized that another write lock or another read lock may be seized concurrently with the read lock.

If there are more than two types of locks, the table above may be extended in more dimensions to indicate the interaction of lock types on seizing new locks. Again, the table above is intended to be exemplary only and is not intended to be all-inclusive or exhaustive of the types of mechanisms that may be used to determine the interaction between lock types. For example, a set of rules may indicate whether a lock may be seized based on various complicated or simplified conditions. For example, a rule may state that a read lock may be seized if there are no more than 10 other read locks currently seized for the object and less than 3 write locks currently seized for the object. Based on the teachings herein, those skilled in the art will recognize many other mechanisms that may be used without departing from the spirit or scope of aspects of the subject matter described herein.

A portion of an exemplary data structure that may be used to specify information in the software model 210 is as follows:

```
<Component Id="BusinessLogicWebService"
    Name="BusinessLogicWebService">
    <Method Id="GetReportData" Name="Get Report Data">
        <Body>
            <LockAction
                Id="GetDBConnection"
                Operation="SeizeRead"
                LockType="DatabaseConnectionLock"
                LockInstanceExpression="1" />
```

-continued

```
<StorageAction
    Id="WebDiskReadHomePage"
    Operation="Read"
    Pattern="Random"
    BlockSize="7096"
    IOSize="1024"/>
<ProcessorAction
    Id="cpuAction2"
    Cycles="2420000"
    ReferenceConfiguration="CPU1"/>
<Invoke ComponentReference="DB" Method="GetReport">
    <Remote>
        <NetworkAction Id="DBCall" MessageSize="800"/>
    </Remote>
</Invoke>
<LockAction
    Id="CloseDBConnection"
    Operation="Release"
    LockType="DatabaseConnectionLock"
    LockInstanceExpression="1" />
<Return>
    <Remote>
        <NetworkAction Id="DBGetReportReturn"
        Operation="Send" MessageSize="1000"/>
    </Remote>
</Return>
</Body>
</Method>
</Component>
```

The bolded text above indicates the lock actions. After a read lock is seized, the method indicates that some storage action is to be performed and some processor action is then to be performed. After the storage and processor actions are performed, the method specifies that read lock is to be released and that a network message is to be sent.

Again, although the above data structure is represented in XML, the information contained therein may also be represented in various other formats without departing from the spirit or scope of aspects of the subject matter described herein.

In one embodiment, lock operations may not be limited to just seize and release operations. For example, a component that has a read lock may wish to upgrade its lock to a write lock. This may be done by defining a write upgrade lock operation. Similarly, a component that has a write lock may wish to downgrade its lock to a read lock. This may be done by defining a read downgrade lock operation. Based on the teachings herein, those skilled in the art may recognize other lock operations that may be defined without departing from the spirit or scope of aspects of the subject matter described herein.

A lock instance identifier may be specified either as a constant (e.g., in shown in the sample XML above) or as a function that returns a specific lock instance identifier. Specifying the lock instance identifier as a function allows different distribution of locks across lockable objects. For example, a function may specify that every third write request is directed to a lock instance associated with a particular database row (using the example described previously). As another example, a function may select a lock instance identifier at random.

A lock instance identifier function (also referred to as "expression") may also be used to cause certain lock requests to contend with other lock requests while some lock requests do not contend with other lock requests. For example, by specifying a sufficiently large number of lock instances or by defining a particular lock instance to be a no-contention lock instance, the function may forward some lock requests to lock instances where there is no contention (e.g., by incrementing a counter and resetting it to the beginning when it gets to the largest lock instance identifier). Other lock requests (e.g., every third lock request) may be forwarded to a particular lock instance where there may be more contention. This allows flexibility in simulating observed locking patterns, for example.

In the example described previously with respect to reading and writing access patterns to tables, one or more lock instance identifier functions may direct reads and writes to particular lock instances to follow the desired lock request distribution.

Referring again to FIG. 2, the deployer 220 receives as input the software model 210 and the hardware model 215. The deployer 220 scans the software model 210 for references to locks and creates as many instances as specified in the software model 210. The deployer 220 may also use the software model 210 to determine the distribution of lock instances across the hold/release commands in the software model 210.

Based on simulation data provided by the simulator, the statistics component 230 may generate various statistics including a utilization of simulated hardware, lock utilization, a number of simulated transactions currently accessing the simulated software object, a number of simulated transactions currently queued and waiting for the simulated software object, a time a simulated transaction waits in a queue to access the simulated software object, and a latency associated with simulated transactions attempting to access the simulated software object, and the like.

In one embodiment, the simulator component 230 may generate various values that reflect the time spent waiting for locks on software objects per transaction. For example, when read and write locks are mutually exclusive, the statistics component 230 may compute a lock instance utilization using the following formula:

$$U_{lock\_instance} = \text{sum}(u_{ti}*ti)/\text{sum}(ti),$$

where ti is a time period when the instantaneous lock instance utilization $u_{ti}$ was constant.

The statistics component 230 may generate an instantaneous utilization using the following formula:

$$u_{ti} = Cr/Mr + Cw/Mw,$$

where Cr is the number of concurrent Read type transactions holding the lock instance, Cw is the number of concurrent Write type transactions, and Mr and Mw are maximum limits for the concurrent Read and Write transactions holding the lock instance.

Lock type utilization may be computed using the following formula:

$$U_{lock\_type} = \max_{lock\_instances}(U_{lock\_instance})$$

Other formulas may be applied when the read and write locks are not mutually exclusive.

A lock instance may be considered over-utilized when its queue length grows continuously or over a given period of time. If the lock instance grows even when given an "infinite" capacity device to use in simulation, this may indicate a software model error such as a missed release of a lock or mismatched lock instance identifiers on seize lock and release lock actions.

The simulator 225 performs a series of simulation actions with respect to the components specified in the software model 210 in conjunction with the hardware specified in the hardware model 215. The simulator may simulate many components and the interaction between the components. As it works through a simulation, the simulator 225 checks the action type of each action. Actions that are locking related may be forwarded to a lock simulator subcomponent that determines whether to allow a lock to be seized or to place a request to seize the lock in a queue.

In one embodiment, the following actions occur when the simulator 225 simulates an action:

1. First the simulator 225 checks the action type of the action. If the action type is not lock related, the simulator may call a hardware simulator component that models the particular action and returns a timestamp that corresponds to a time taken to perform the action. If the action type is lock related, the simulator 225 extracts the lock type identifier and the lock instance identifier and locates the proper lock model instance.

2. The simulation engine then calls the appropriate lock model simulator component and passes appropriate parameters (e.g., lock ID, lock instance ID, lock operation type (e.g., seize, release, etc.), lock type, and the like. Passing a lock instance ID may involve calling a function or evaluating an expression as described previously.

3. The lock model simulator component may create an event for the action and then call a queue manager (see below) for further processing.

4. The queue manager determines if the event can be accepted for immediate processing. To do so, the queue manager may:

A. Determine if the lock is not currently being held. If the lock is not being held, the lock is deemed available.

B. Determine if other locks affect the availability of the lock as described previously. For example if the number of current locks of the given type is less than the maximum number of locks of this type.

5. If the lock is available, the lock model simulator component updates a lock hold counter and marks the event as completed. This allows the transaction to proceed to its next action (e.g., processor action, hard disk action, etc.).

6. If the lock is not available, the event is placed in a queue associated with the lock. The transaction blocks until the lock becomes available. Note that blocking a transaction does not hold or reduce the speed of simulation; blocking a transaction means that the subsequent actions in the transaction are not simulated until the transaction is unblocked.

In another embodiment, there may be more than one queue associated with the same lock. For example, there may be a high priority queue and a low priority queue. Routing of a transaction to the correct queue may be a function of transaction properties such as transaction type.

In some embodiments, a queue may have a queue length limit so that if this limit is reached, then subsequent transactions will be simulated as failed (or rejected) until the queue length decreases below the limit.

In one embodiment, to release a lock, the following actions occur when the simulator 225 simulates a release lock action:

1. The simulator 225 detects the lock release action and locates the lock type identifier and the lock instance identifier associated with the lock.

2. The simulation engine calls the appropriate lock model simulator component and passes the appropriate parameters.

3. The lock model simulator component creates a lock release event and calls the queue manager.

4. The current lock hold counter is updated and the event is marked as complete.

5. If the lock hold counter becomes less than the maximum number of lock holds of the appropriate type (e.g., read, write, etc.), then queued locks may be examined to determine if they are allowed to seize a lock. Normally, the first queued lock request is examined, but as described previously, in some embodiments, a queued lock request other than the first one may be examined. If a lock request is taken from the queue, its associated transaction is unblocked.

Figure 3:
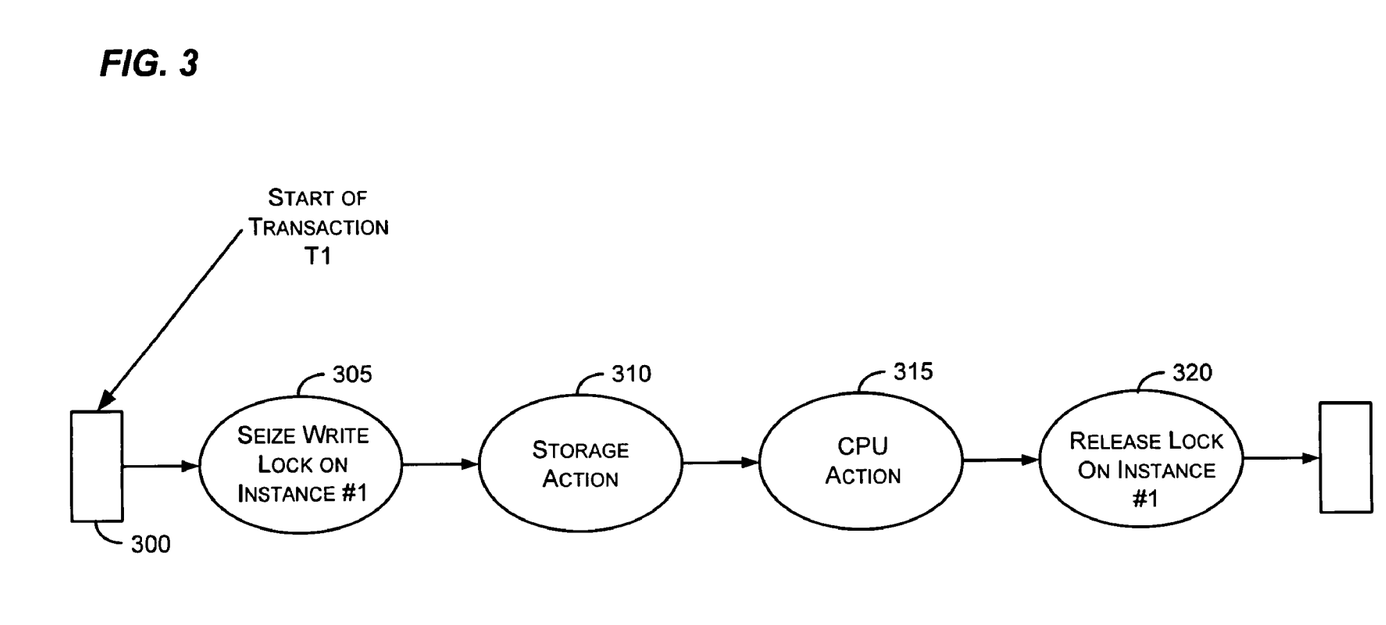
FIG. 3 is a block diagram that generally represents exemplary actions with respect to a simulation in accordance with aspects of the subject matter described herein.

FIG. 3 is a block diagram that generally represents exemplary actions with respect to a simulation in accordance with aspects of the subject matter described herein. The simulation illustrates an exemplary sequence of simulated events with respect to a transaction that needs to seize a lock (e.g., block 305), perform some storage actions (e.g., block 310), perform some CPU actions (e.g., block 315), and release the lock (e.g., block 320).

To generate a list of actions to simulate (such as those illustrated in FIG. 3), the simulator 225 of FIG. 2 may read the method indicated in the exemplary XML given previously and determine a sequence of actions to perform.

To simulate an action, the simulator 225 may pass simulation parameters to a simulator module (e.g., part of the simulator 225) that is capable of simulating the particular action. A simulator module may return a timestamp that corresponds to a time at which the actions are completed in the simulation. This time may be influenced by the time at which a lock becomes available which may in turn be influenced by how many lock requests are in a queue, the modeled hardware components, and the like.

Turning to FIG. 3, at point 300, a transaction (T1) starts.

At point 305, the transaction attempts to seize a write lock on instance 1 of a lock. To do this, the simulator 225 may pass lock seize parameters to a lock component that models the lock. In response, the lock component may determine if a lock is available and may also determine whether other current locks (e.g, an exclusive write lock) affect whether the lock requested can be seized. If a lock is not available or cannot otherwise be seized, the lock request is placed in a queue. The subsequent actions 310-320 do not occur until the transaction has seized the lock requested at 305.

Figure 4:
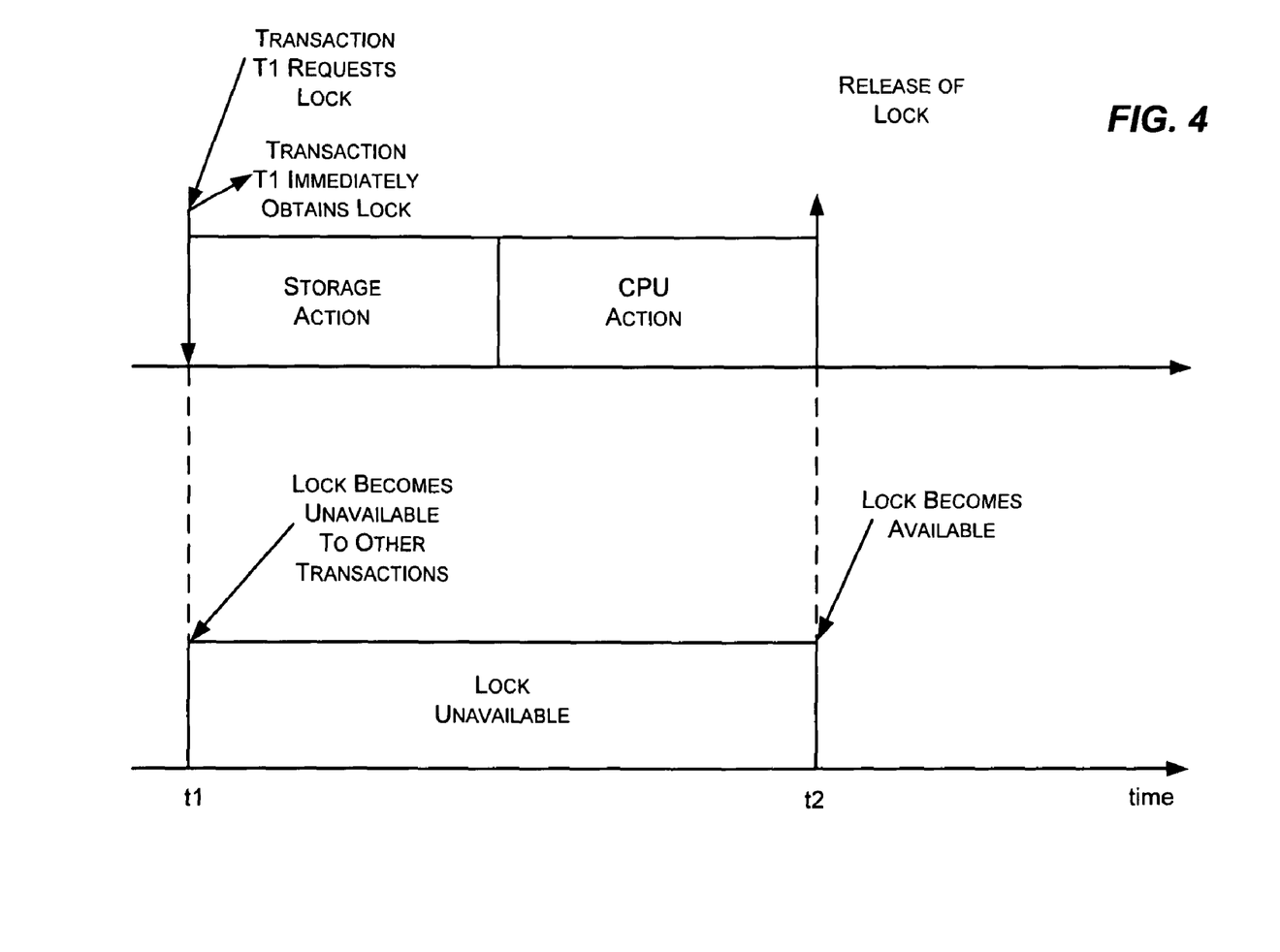
FIG. 4 is a timing diagram that represents actions along a timeline corresponding to the actions indicated in FIG. 3 in accordance with aspects of the subject matter described herein.

FIG. 4 is a timing diagram that represents actions along a timeline corresponding to the actions indicated in FIG. 3 in accordance with aspects of the subject matter described herein. At time t1, the transaction T1 attempts to seize a write lock on instance 1 of a lock. If the lock instance can accept a new transaction lock of the requested type (in this case a write lock), the simulator increments the counter of the current write locks on the software object and completes the lock seize action with latency of zero. Because the lock is available in this example, T1 immediately obtains the lock. After the lock has been taken, this causes the lock to be unavailable between the time t1 and t2. During this time period, the storage action and the CPU action are taken. Afterwards, the transaction T1 releases the lock and in response, the simulator decrements the counter of current write locks on the software object for the instance 1 of the lock. This makes the lock instance available for other transactions.

As mentioned previously, each lock instance maintains the current count of Write and Read locks (and other types of locks if appropriate) currently seized on the lock. The number of concurrent Write and Read transactions is not allowed to exceed the maximum counts specified in the lock type declaration. Using these rules, the simulator determines whether the lock instance is available for a transaction to seize it. If the lock instance is not available, the request to seize the lock together with any needed information to identify the transaction is placed in the waiting queue until the lock instance is released.

Figure 5:
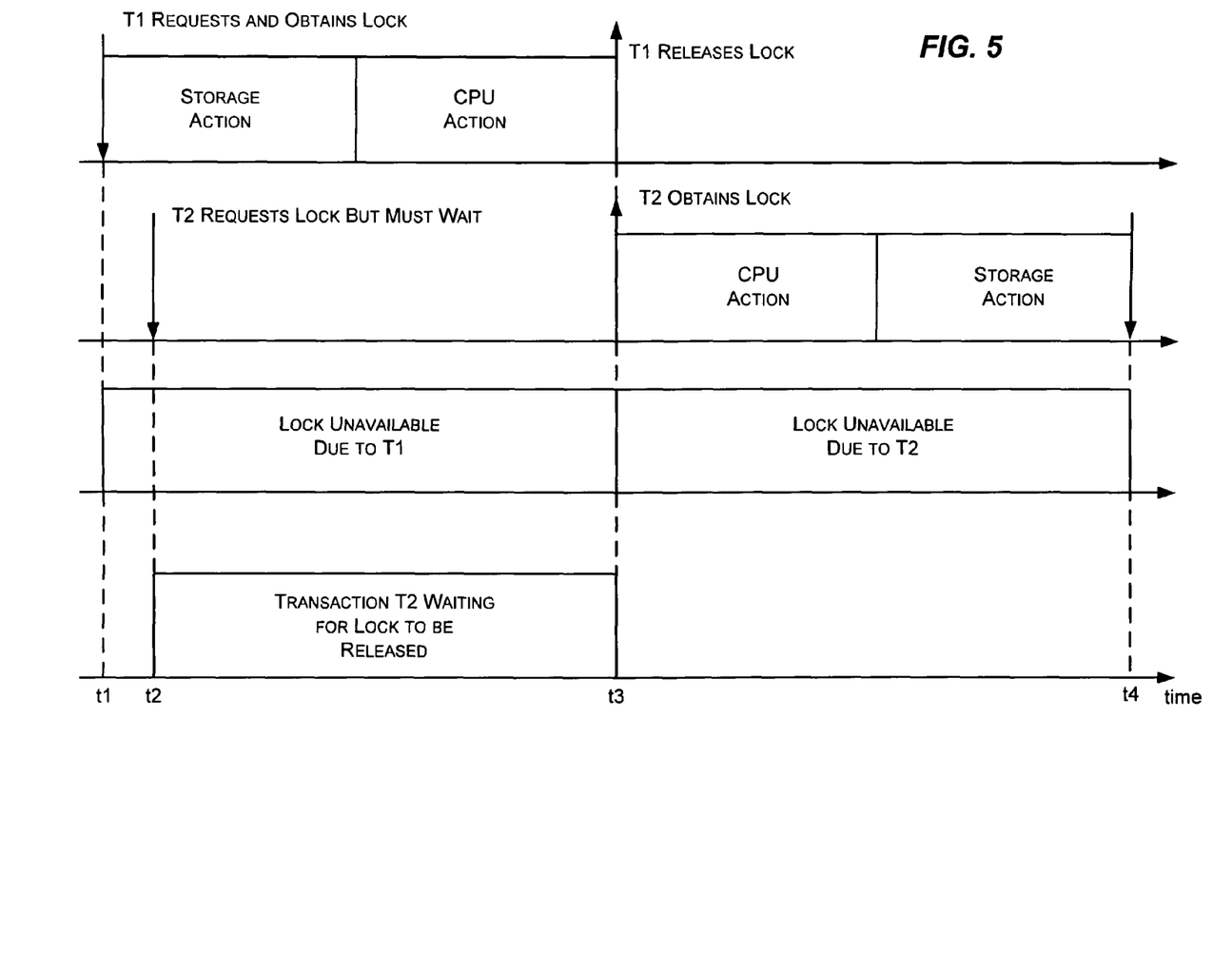
FIG. 5 is a timing diagram that represents actions along a timeline that occur when two transaction attempt to obtain an exclusive lock in accordance with aspects of the subject matter described herein.

FIG. 5 is a timing diagram that represents actions along a timeline that occur when two transactions attempt to obtain an exclusive lock in accordance with aspects of the subject matter described herein. At time t1, transaction T1 requests and obtains a lock. At time t2, transaction t2 attempts to seize the lock. Because T1 has already obtained the lock and the lock is exclusive, T2 is not allowed to obtain the lock until T1 has released it. T2's request to seize the lock is queued in a queue associated with the lock.

At time t3, T1 releases the lock and T2's queued request seizes the lock. After T1 releases the lock and T2 seizes the lock, T2's actions are allowed to proceed. At time t4, T2 releases the lock. Between times t2 and t3, T2 waits for the lock to be released by T1. This waiting period is a result of interaction between software components and the speed at which the simulated hardware is able to execute the actions associated with T1.

Figure 6:
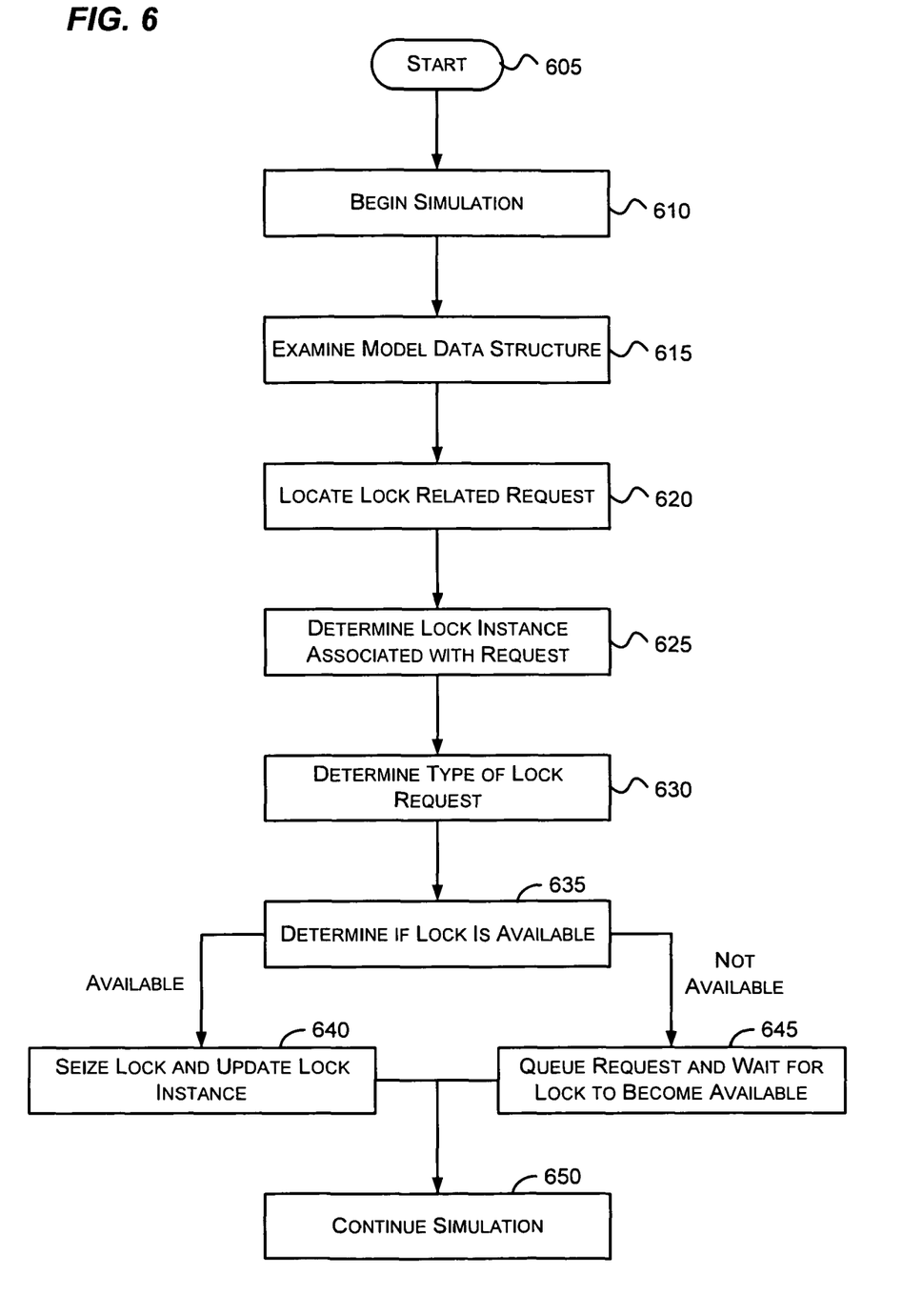
FIG. 6 is a flow diagram that generally represents actions that may occur in one exemplary embodiment in simulating software contention in accordance with aspects of the subject matter described herein.
Figure 7:
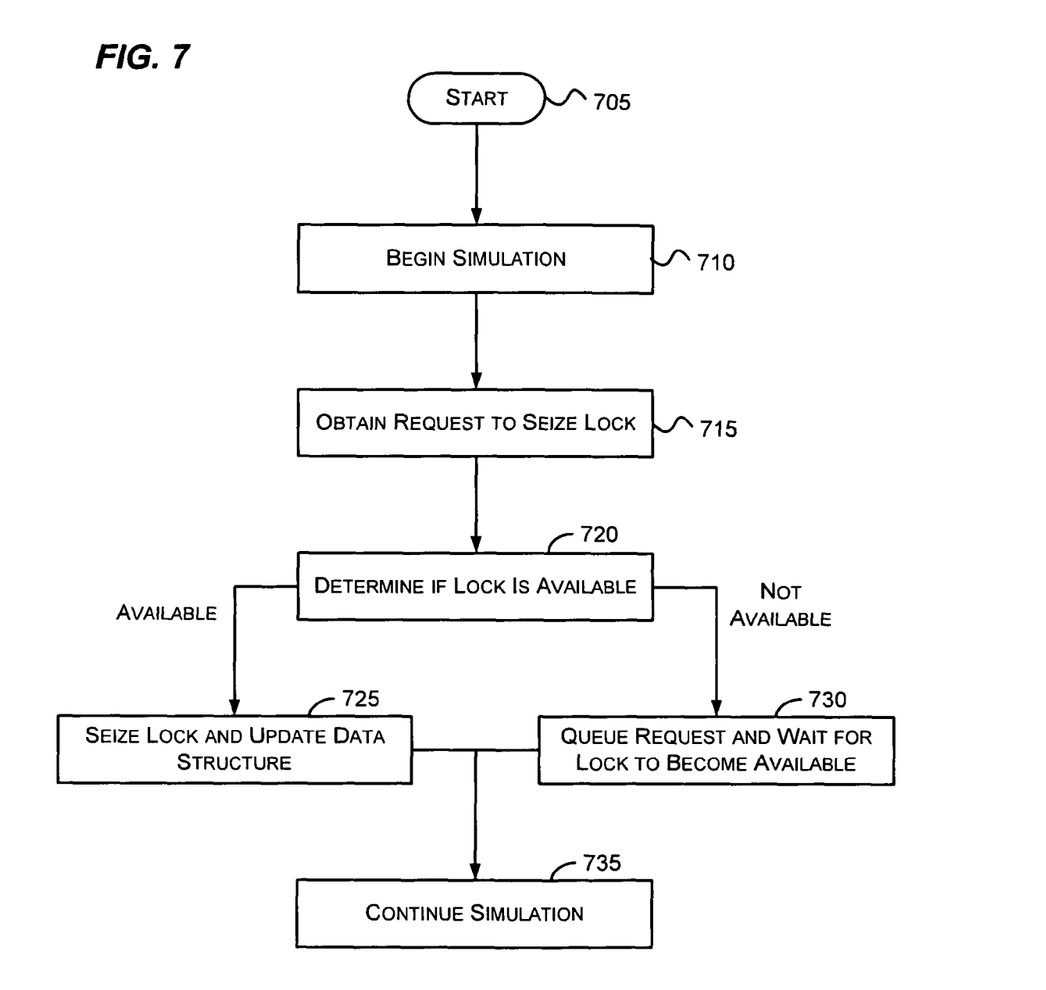
FIG. 7 is a flow diagram that generally represents actions that may occur in another exemplary embodiment in simulating software contention in accordance with aspects of the subject matter described herein.

FIGS. 6-7 are flow diagrams that general represent actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents actions that may occur in one exemplary embodiment in simulating software contention in accordance with aspects of the subject matter described herein. Turning to FIG. 6, at block 605, the actions begin.

At block 610, a simulation may begin. For example, referring to FIG. 2, the apparatus 205 begins a simulation by executing simulation components contained thereon.

At block 615, data structures that include hardware and software models may be examined. For example, referring to FIG. 2, the deployer 220 may examine the software and hardware models 210 and 215, respectively. The deployer 220 may find lock related actions and create one or more data structures to track available locks for lock instances.

At block 620, lock related requests within the data structure are located. For example, referring to FIG. 2, the simulator 225 may examine the software model 210 and begin simulating one or more components defined therein. In simulating a method of a component, the simulator 225 may encounter a lock related request (e.g., a seize or release action).

At block 625, a lock instance associated with the request is determined. For example, referring to FIG. 2, the simulator 225 may execute a function to obtain a lock instance identifier. As another example, the simulator 225 may find a lock instance by finding the lock instance associated with the request (e.g., a release request).

At block 630, a type of the lock request is determined. For example, referring to FIG. 2, the simulator 225 determines the type of lock requested in the request.

At block 635, a determination is made as to whether the lock requested is available. If it is available, the actions continue at block 640; otherwise, the actions continue at block 645. For example, the simulator 225 may find a data structure associated with the lock instance and determine whether any locks are available for the lock instance. The simulator 225 may also apply rules regarding interaction between lock types as described previously.

At block 640, the lock is seized and lock instance data is updated. For example, referring to FIG. 2, the simulator 225 updates the data structure of the lock instance to indicate that the lock was seized.

At block 645, an item for the request is queued and remains waiting in the queue until the lock becomes available. No further simulation activities regarding the queued transaction proceed until after the lock becomes available to the queued item. For example, referring to FIG. 2, the simulator 225, the simulator may queue an item related to the lock request in a queue. This item remains in the queue until a lock on the lock instance of the particular type becomes available. Afterwards, the item may be removed from the queue and the lock seized by the queued item. For example, referring to FIG. 5, an item in the queue related to transaction T2 may wait until time t3 to obtain a lock.

At block 650, simulation activities continue. For example, referring to FIG. 2, the simulator 225 may continue to simulate hardware and software for as long as desired or specified by a user. As another example, during block 650, a lock seized at block 640 may be released.

FIG. 7 is a flow diagram that generally represents actions that may occur in another exemplary embodiment in simulating software contention in accordance with aspects of the subject matter described herein.

At block 705, the actions begin.

At block 710, a simulation may begin. For example, referring to FIG. 2, the apparatus 205 begins a simulation by executing simulation components contained thereon.

At block 715, a request to seize a lock is obtained. For example, referring to FIG. 2, the simulator 225 obtains a request to seize a lock from the software model 210.

At block 720, a determination of whether the lock is available is made. If the lock is available, the actions continue at block 725; otherwise, the actions continue at block 730. For example, referring to FIG. 2, the simulator 225 locates a data structure (e.g., a lock instance) associated with the lock and uses the data structure to determine whether the lock is available. The determination may also involve evaluating rules or other logic that defines how locks may affect each other as described previously.

At block 725, the lock is seized and a data structure is updated to reflect this action. For example, referring to FIG. 2, the simulator 225 updates the data structure to indicate that the lock was seized.

At block 730, an item is placed in a queue associated with the lock and the progress of the transaction is halted until the lock becomes available. For example, referring to FIG. 2, the simulator 225 places an item in a queue associated with the lock and halts the progress of the transaction until the lock becomes available to the transaction. This may involve waiting as other transactions ahead of the transaction obtain and release the lock.

At block 735, the simulation continues. For example, referring to FIG. 2, the simulator 225 may continue to simulate hardware and software for as long as desired or specified by a user. As another example, during block 735, a lock seized at block 725 may be released.

As can be seen from the foregoing detailed description, aspects have been described related to modeling and simulating software contention. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method for simulating software contention related to software components, the method implemented at least in part by a computer, the method comprising:
    examining, by a processor, a data structure that defines resources needed by a simulated software component;
    determining that the data structure defines a lock related request that involves a simulated software object;
    determining a lock instance associated with the lock related request, the lock instance including information identifying locks available for the lock instance, the lock instance determined by evaluating a function that returns a lock instance identifier, the function modeling a distribution of lock requests across a plurality of lock instances for the simulated software object;
    determining a first type of the lock related request, the lock type corresponding to the simulated software object; and
    determining if a lock of the first type is available for the lock instance.

2. The method of claim 1, wherein determining if a lock of the first type is available for the lock instance comprises consulting a data structure that indicates effects, if any, that locks of a second type have on locks of the first type.

3. The method of claim 1, wherein determining if a lock of the first type is available for the object comprises evaluating rules that account for effects that one or more locks on the object have on the lock of the first type.

4. The method of claim 1, wherein the first type comprises a write lock request.

5. The method of claim 1, wherein the first type comprises a read lock request.

6. The method of claim 1, further comprising:
    if a lock of the first type is available for the lock instance, seizing the lock and changing a value to reflect seizing the lock for the lock instance; and
    if a lock of the first type is not available for the object, queuing an item related to the lock related request and suspending simulation of a transaction associated with the lock related request until the lock of the first type is available for the lock instance.

7. The method of claim 1, wherein the data structure includes definitions of one or more lock types and a maximum number of concurrent locks obtainable for each lock type.

8. The method of claim 1, wherein there are a limited number of locks available for the lock instance.

9. The method of claim 1, wherein the simulated software object corresponds to, but is not limited to, one of: a thread pool, a database table lock, a set of connections, a software queue, a critical section, a mutex, and a semaphore.

10. The method of claim 1, further comprising calculating a utilization of simulated hardware, a lock utilization, a number of simulated transactions concurrently accessing the simulated software object, a number of simulated transactions currently queued and waiting for the simulated software object, a time a simulated transaction waits in a queue to access the simulated software object, and a total latency associated with the simulated transaction, the total latency including time the simulated transaction waits in queues waiting for access to different software objects and latencies predicted by one or more hardware models due to hardware utilization.

11. In a computing environment, an apparatus, comprising:
    a store operable to persist modeling data, the modeling data including software modeling data and hardware modeling data, the modeling data including data for modeling contention for a scarce software object;
    a deployer operable to identify requests within the software modeling data, the requests relating to locks on the scarce software object, the deployer further operable to create one or more data structures that track lock availability on a plurality of instances related to the scarce software object, the lock availability tracked according to a number of available instances of a lock type, the lock type corresponding to the scarce software object, wherein lock requests for the scarce software object are distributed across the plurality of instances as determined by evaluating a function that returns an instance identifier; and
    a simulator operable to examine the modeling data and to simulate the contention for locks on the scarce software object.

12. The apparatus of claim 11, wherein the modeling data includes a lock model configuration, the lock model configuration including an identifier, a maximum number of concurrent reads allowed for a lock, and a maximum number of concurrent writes allowed for the lock.

13. The apparatus of claim 11, wherein the modeling data includes a lock type associated with the scarce software object the lock type identifying a number of the one or more data structures that track lock availability of the one or more instances of the scarce software object.

14. The apparatus of claim 11, wherein the apparatus further comprises a statistics component operable to calculate a value that represents a utilization of scarce software objects represented by lock types and lock instances and simulated by the simulator.

15. The apparatus of claim 11, wherein the modeling data defines affects that a lock of a first type has on a lock of a second type for the scarce software object such that having a lock of the first type may preclude obtaining a lock of the second type until the lock of the first type is released.

16. A computer storage medium having computer-executable instructions at least in part for simulating software, the instructions when executed performing actions, comprising:
    obtaining a request of a simulated transaction to seize a lock for an instance of a scarce software object, the instance determined by evaluating a function that returns an instance identifier, the function modeling a distribution of lock requests across a plurality of instances;
    determining whether the lock is available by checking a value that indicates how many concurrent locks of a particular lock type are allowed on an instance of the scarce software object, the lock type corresponding to the scarce software object;
    if the lock is available, seizing the lock and modifying a data structure to indicate that the lock was seized; and
    if the lock is unavailable, placing an item in a lock queue associated with the lock and halting progress of the simulated transaction at least until the lock is available.

17. The computer storage medium of claim 16 having additional computer-executable instructions, which when executed perform actions, comprising if the lock is unavailable, retrieving the item from the lock queue and updating a simulated value that represents simulated time in which the item remained in the lock queue.

18. The computer storage medium of claim 16, wherein determining whether the lock is available further comprises determining whether one or more locks of another type affect allowing the simulated transaction to seize the lock.

* * * * *